United States Patent [19]

Breimesser et al.

[11] Patent Number: 4,742,494

[45] Date of Patent: May 3, 1988

[54] DEVICE FOR READING A TWO-DIMENSIONAL CHARGE IMAGE

[75] Inventors: Fritz Breimesser, Nüremberg; Bernd Granz, Oberasbach; Bertram Sachs, Erlangen, all of Fed. Rep. of Germany

[73] Assignee: Siemens Aktiengesellschaft, Berlin and Munich, Fed. Rep. of Germany

[21] Appl. No.: 82,041

[22] Filed: Aug. 5, 1987

[30] Foreign Application Priority Data

Aug. 11, 1986 [DE] Fed. Rep. of Germany ....... 3627159

[51] Int. Cl.[4] ........................ G03B 42/06; H04N 3/14

[52] U.S. Cl. .................................... 367/7; 358/213.11

[58] Field of Search ............... 367/7; 346/139 C, 159; 358/213.11, 212, 285

[56] References Cited

U.S. PATENT DOCUMENTS

| | | | |
|---|---|---|---|
| 3,988,536 | 10/1976 | Moricca | 358/213.11 |
| 4,025,910 | 5/1977 | Walker | 358/213.11 |
| 4,592,029 | 5/1986 | Altmann et al. | 367/7 |
| 4,661,814 | 4/1987 | Granz et al. | 358/213.11 |

*Primary Examiner*—Thomas H. Tarcza
*Assistant Examiner*—Ian J. Lobo
*Attorney, Agent, or Firm*—Kenyon & Kenyon

[57] ABSTRACT

Stacked slab-shaped support bodies of electrically insulated material are provided with electrodes at one of their side surfaces. In the stack, the electrodes of a support body form the rows of a matrix. The support bodies are each connected detachably to a circuit board on which switchable amplifiers are arranged. In a preferred embodiment, the switchable amplifiers are dual-gate MOS-FETs, the first gate terminals of which are each connected electrically to an electrode of the support body.

6 Claims, 1 Drawing Sheet

DEVICE FOR READING A TWO-DIMENSIONAL CHARGE IMAGE

BACKGROUND OF THE INVENTION

The present invention relates to a device for reading a two-dimensional charge image such as is disclosed, for instance, in U.S. Pat. No. 4,592,029.

In this publication, a device for reading a two-dimensional charge image is disclosed which contains an array of electrodes which are arranged on the narrow sides of stacked circuit boards. Always one of the flat sides of the circuit board is provided with a recess extending parallel to the narrow sides. The recess serves to make room for the electronic components located on the board adjacently in the stack. The electrodes arranged one behind the other in the lengthwise direction on the narrow side of a circuit board are connected via connecting conductors of approximately equal length to switchable amplifiers which are likewise arranged one behind the other in the longitudinal direction. The electrodes belonging to a circuit board form the rows of a matrix on the stack. As switchable amplifiers, dual-gate MOS-FETs are provided, the input of which is additionally protected by a leak resistor arranged on the circuit board. The amplifiers located on a circuit board belong to an image row of the matrix. The outputs of these amplifiers are connected to a common output line. The control inputs of the amplifiers are each connected to main control lines which are arranged on the narrow side of the circuit board opposite the electrodes in the direction of the columns of the matrix. The amplifiers belonging to a column of the matrix are associated here with a common main control line. The charge image generated on the electrode matrix can thereby be read out column by column. In order to obtain high local resolution, the thickness of the circuit board as well as the raster pitch for the electrode is limited to values which are smaller than 1 mm. Since only little space is available for the electronic components regarding the overall height due to the limited depth of the recesses milled into the circuit board, the circuit boards are made by a standard hybrid technique. The passive components, for instance, the leak resistor, are applied to the circuit board of aluminum oxide $Al_2O_3$ by a thin-film technique and the switchable dual-gate MOS-FETs are cemented and wire bonded as semiconductor chips on the circuit board.

This known arrangement, however, has the disadvantage that it can be ascertained only after a circuit board is assembled and the bond connections are made whether a component, for instance, the dual-gate MOS-FET, is defective. If this is the case, the entire assembled circuit board is useless. Since such a circuit board can contain up to 200 amplifier chips, a low yield can be expected in production. A defect rate in bonding the individual chips of, for instance, only 1% would lead to the situation that of about eight circuit boards only one is usable on the average. In addition, the entire circuit board must be replaced if a defect occurs in operation, for instance, by mechanical damage to an electrode.

SUMMARY OF THE INVENTION

It is therefore an object of the present invention to provide a device for reading a two-dimensional charge image which can be manufactured with a low failure rate and does not require the replacement of the entire circuit board in the event of the failure of an individual picture element.

The above and other objects of the invention are achieved by a device for reading a two-dimensional charge image comprising stacked slab-shaped support bodies of electrically insulating material, the support bodies being each provided with electrodes on their side surfaces, the electrodes being arranged in the longitudinal direction one behind the other such that they form the rows of a matrix in the stack, the support bodies being each connected detachably to a circuit board, the circuit board having switchable amplifiers, and the electrodes of the support body being each connected electrically to a switchable amplifier on the circuit board associated with the support body.

Since the support bodies of the electrodes and the circuit boards associated with them are connected detachably, they can be produced and tested independently of each other. If, for instance, an electrode on the support body becomes defective during operation, the circuit board can be separated from the support body and be connected with a new, tested support body. In a preferred embodiment the lateral surfaces of the support body are provided with mutually parallel conductor runs which lead to the electrodes. The circuit boards contain in the same raster pitch signal contact surfaces so that the support body and the circuit board can be soldered to each other after pre-tinning the signal contact surfaces and the conductor runs on the support body.

In one advantageous embodiment, the support bodies comprise glass or ceramic, preferably aluminum oxide $Al_2O_3$. Dual-gate MOS-FETs are particularly well suited as switchable amplifiers.

Since the circuit boards and the support bodies for the electrodes can be manufactured independently of each other, a very thin circuit board can be used, the thickness of which preferably does not exceed 0.1 mm. It is possible thereby, with a raster pitch in the column direction of the matrix of up to 1.3 mm, to equip the circuit board with switchable amplifiers which are arranged in a housing. In a preferred embodiment, the dual-gate MOS-FETs are disposed in an SOT housing which is suitable for equipping circuit boards by an SMD technique. Milling a recess down to a remaining wall thickness of about 0.1 mm can be carried out technically only at considerable cost so that in the embodiment according to the prior art, equipping the circuit board with switchable amplifiers which are arranged in a housing is not possible with the same extent of the electrodes in the column direction. The advantage of using "housed" switchable amplifiers now consists in that the individual amplifiers can be tested before they are assembled and additionally, the danger of damaging the MOS-FET is considerably less than with the bonding process in the assembly. Thereby, the reject rate on the manufacture of the circuit board is reduced considerably.

In one advantageous embodiment, the gate terminals of the MOS- FETs connected to a respective electrode are protected by a leak resistor which is integrated in the MOS-FET.

BRIEF DESCRIPTION OF THE DRAWINGS

For a further explanation of the invention, reference is made to the drawings, in which.

DETAILED DESCRIPTION

Figure 1:
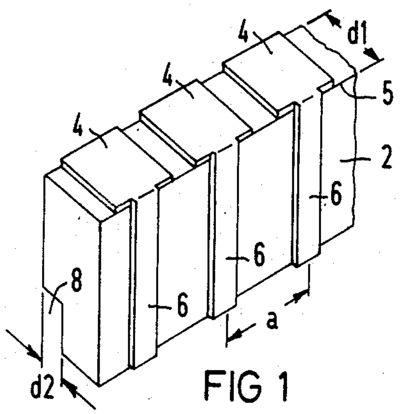
FIG. 1 shows in perspective an advantageous embodiment of the support body for the electrodes.

According to FIG. 1, a slab-shaped support body 2 is provided on one of its side surfaces with, for instance, slab-shaped electrodes 4. The support body 2 comprises an electrically insulating material, preferably of ceramic and in particular of aluminum oxide $Al_2O_3$. The electrodes comprise an electrically conducting material, for instance, gold (Au). A side surface of the support body 2 which is perpendicular to the electrodes 4 and extends in the longitudinal direction is provided with mutually parallel conductor runs 6 which touch the electrodes 4 at an edge 5. The raster pitch of the conductor runs corresponds to the raster pitch of the electrodes 4. In a preferred embodiment, the thickness d1 of the support body 2 is less than 2 mm, in particular about 1.3 mm. The side surface of the support body 2 opposite the side surface provided with conductor runs 6 is provided in the longitudinal direction with a recess 8 which extends up to the edge of the side surface facing away from the electrodes 4.

Figure 2:
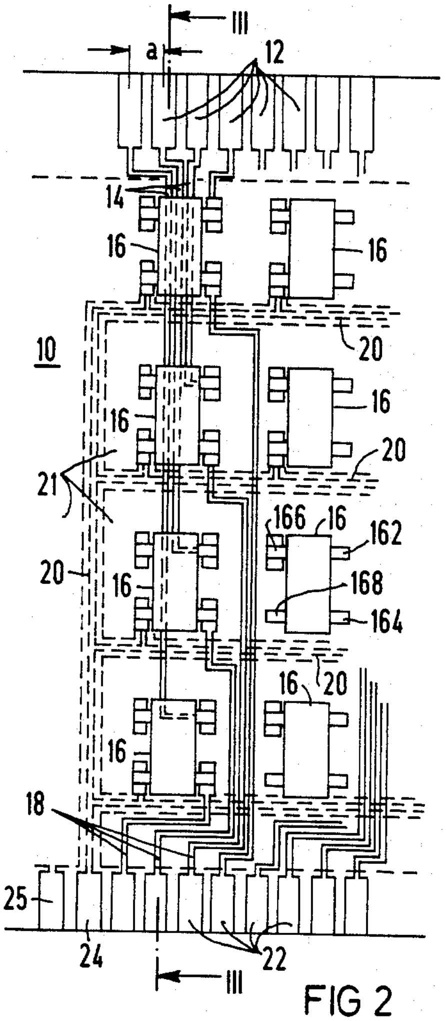
FIG. 2 shows in a top view a portion of an assembled circuit board in a preferred embodiment.

According to FIG. 2, signal contact surfaces 12 with a raster pitch a are arranged in a circuit board 10 on one flat side in its edge region in the lengthwise direction. This raster pitch corresponds to the raster pitch a of the conductor runs of the support body 2 according to FIG. 1. From these signal contact surfaces 12, signal lines 14 lead to switchable amplifiers. The switchable amplifiers are dual-gate MOS-FETs 16 of which the first gate terminals 162 are each connected to a signal contact surface 12. In the edge region of the component side of the circuit board 10 opposite the signal contact surfaces 12, the latter is provided with switch contact surfaces 22, from which switching lines 18 lead to a second respective gate terminal 164 of the dual-gate MOS-FET 16. In a preferred embodiment, dual-gate MOS-FETs 16, for instance, are in an SOT housing and the connections to the conductor runs are made by an SMD technique. In a particularly preferred embodiment, the dual-gate MOS-FETs 16 are accommodated in SOT housings separated from each other. The dual-gate MOS-FETs 16 are then arranged in groups side by side, the number of dual-gate MOS-FETs 16 arranged in a group one below each other being obtained from the ratio between the geometric space required by an individual dual-gate MOS-FET 16 and the raster pitch a. According to FIG. 2, for instance, the dual-gate MOS-FETs 16 are arranged side by side in groups of four. The drain terminal 168 of the dual-gate MOS-FET 16 is connected to an output line 20 which leads to an output signal contact surface 24 which is common to all dual-gate MOS-FETs 16. On the circuit board 10 is also arranged a ground contact area 25 which is connected via ground lines 21 to the source terminal 166 of the dual-gate MOS-FETs 16. The output lines 20 and the ground lines 21 are located on the flat side of the circuit board 10 which is opposite the component side so that in the region of the drain terminals 168 and the source terminals 166 of the dual-gate MOS-FET 16, through contacts are necessary. The ground lines 21 are realized, in a preferred embodiment, with a large area and cover the back side of the circuit board almost completely except for the region provided for the output lines 20.

The first gate terminal 162 is protected against excessive charges by means of a leak resistor to ground which is integrated, in a preferred embodiment, in the MOS-FET 16.

Figure 3:
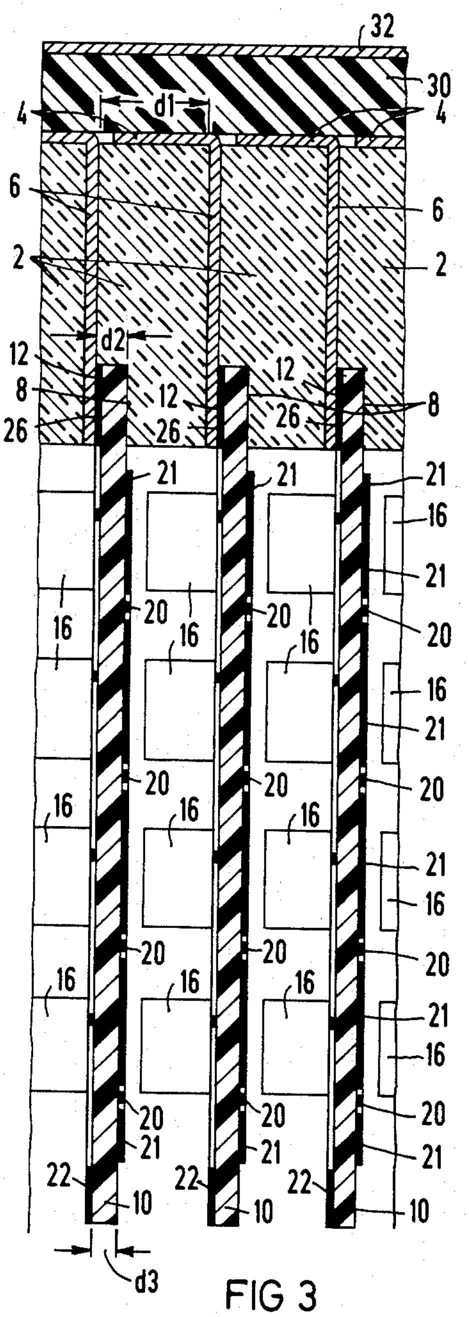
FIG. 3 shows the device according to the invention is schematically illustrated in a cross section.

In the stack shown in cross section in FIG. 3, the side surfaces of the support bodies 2 provided with the conductor runs 6 overlap the flat side of the circuit boards 10, on which the signal contact surfaces 12 are located. The contact area 26 generated is smaller than the corresponding side surface of the support body 2. The electrodes 4 are arranged in the stack in the form of a matrix, the rows of which are formed by the electrodes 4 located on a single support body 2. In a preferred embodiment, the circuit boards 10 are soldered to the support body 2 at the pre-tinned signal contact surfaces 12 and the conductor runs 6, respectively. The connection of the support body 2 and the circuit board 10 can be made and detached here by local heating in the vicinity of the contact area 24. The circuit board 10 can then be equipped already with the dual-gate MOS-FETs 16. The thickness $d_3$ of the circuit board 10 is somewhat smaller than the thickness $d_2$ of the recesses 8 of the support bodies 2 so that the support bodies 2 can be stacked without space in between with a minimum spacing between the electrodes 4. In one advantageous embodiment, the side opposite the conductor runs 6 and the end faces of the support body 2 are provided with a conductive layer which serves as ground. For the electrical insulation of the conductor runs 6 from each other, a thin electrically insulating foil must then be inserted in the stack. In a preferred embodiment, the thickness d3 of the circuit boards 10 is smaller than 0.2 mm and in particular about 0.1 mm. The overall height of the housing of the dual-gate MOS-FET 16 is, in an SOT housing, for instance, about 1.1 mm. Thereby, a minimum thickness of the support bodies 2 is obtained which is about 1.3 mm. This dimension corresponds to the picture resolution in the direction of the columns which can be achieved with this device.

With this device the electric charge signal induced in a converter 30 adjacent to the electrode 4 can be read. The converter 30 can be, for instance, a coherent plate or foil or can be constructed from several rods. The side surface of the converter 30 opposite the electrodes 4 is provided with a conductive layer 32 which is connected to ground together with the source terminal 166 of the dual-gate MOS-FET 16.

The charge distribution generated by external action, for instance, by light, pressure or temperature in the converter 30 can therefore be read via the electrodes 4. The converter 30 may, for instance, be made of piezo or pyroelectric material, for instance, of piezoceramic or PVDF, or light-sensitive material, for instance, silicon. The impedance of the leak resistor integrated in the MOS-FET 16 must be very much higher here than the impedance of the electrodes 4 to ground which, for instance, in the case of a piezoelectric transducer 30 for measuring ultrasonic signals is given essentially by its capacity and the ultrasound frequency.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A device for reading a two-dimensional charge comprising:
 a plurality of stacked slab-shaped support bodies of electrically insulating material forming a stack;
 the support bodies being each provided with a plurality of electrodes on a side surface thereof;
 the electrodes being arranged in the longitudinal direction one behind the other in such a manner that they form the rows of a matrix in the stack;
 the support bodies being each connected detachably to a circuit board;
 the circuit board comprising switchable amplifiers and
 the electrodes of the support body being each connected electrically to a switchable amplifier on the circuit board associated with the support body.

2. The device recited in claim 1, wherein:
 the support bodies are provided on a side surface thereof which extends in the longitudinal direction and is perpendicular to the electrodes with mutually parallel conductor runs which lead to the electrodes;
 the circuit boards each comprise on a flat side thereof, in the edge region of the flat side, signal contact surfaces having a raster pitch which corresponds to the raster pitch of the conductor runs on the support body;
 the side surfaces of the support bodies are provided with conductor runs and the flat sides of the circuit boards provided with the signal contact surfaces associated with them overlap a contact surface which is smaller than the respective flat sides or side surfaces; and
 the side surfaces of the support bodies are each provided in their surface region opposite the contact surface with a recess having a depth which is larger than the thickness of the circuit board.

3. The device recited in claim 1, wherein the switchable amplifiers comprise dual-gate MOS-FETs.

4. The device recited in claim 3, further comprising a leak resistor between a first gate terminal and a source terminal of the MOS-FETs each of which is integrated in the dual-gate MOS-FETs.

5. The device recited in claim 1, wherein the switchable amplifiers are arranged in housings.

6. The device recited in claim 1, wherein the switchable amplifiers are arranged in SOT housings.

* * * * *